Patented June 11, 1940

2,203,899

UNITED STATES PATENT OFFICE 2,203,899

RUBBER COMPOSITION AND METHOD OF PRESERVING RUBBER

Raymond F. Dunbrook and Bingham J. Humphrey, Akron, Ohio, assignors to The Firestone Tire & Rubber Company, Akron, Ohio, a corporation of Ohio No Drawing. Application April 26, 1939, Serial No. 270,206

15 Claims. (Cl. 260—800)

This invention relates especially to improved age-resisting rubber compositions and methods of making the same, and is of primary utility in the manufacture of carbon black rubber stocks, such as tire tread stocks, that are subject to light, heat, oxidation, abrasion, flexing, and other destructive agencies during use.

The chief objects of the invention are to provide a class of materials suitable for incorporating in, or for otherwise treating, rubber compositions to retard deterioration thereof; to improve the resistance of rubber to abrasion; and to check or retard the formation of cracks in carbon black rubber stocks. Other objects will be manifest as the specification proceeds.

This invention consists in the incorporation in rubber or rubber-like organic materials (e. g., "synthetic rubber," gutta-percha, balata), of an antioxidant or age-retarding compound of the preferred class of 2,2,4,6-tetrasubstituted 1,2-dihydroquinolines represented by the general formula

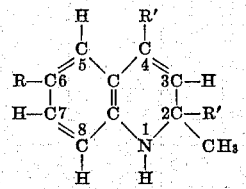

wherein R' in the 2 and 4 positions is an alkyl radical and R in the 6 position is an alkyl or cyclo-alkyl radical.

It is known that 2,2,4-trimethyl-1,2-dihydroquinoline acts to some extent as an antioxidant for rubber. However, the relatively high volatility of this substance has prevented it from being used commercially by the rubber industry. Some disadvantages which have accompanied the attempted utilization of this substance are the following: (1) great loss of the substance by volatilization during processing of the rubber mixtures, (2) danger to health of workmen due to high concentration of the vapor in the air during processing, and (3) excessive loss of the substance from the finished rubber article during ordinary service, with consequent poor practical aging of the article. British Patent 450,323 describes a method of improving the trimethyl-dihydroquinoline as an antioxidant by polymerizing it to a non-volatile resin.

Various substitution products of the trimethyl-dihydroquinoline have been prepared and found to be much less volatile than the simpler substance. However, the effectiveness of these new substances as rubber antioxidants varies greatly, some being much superior antioxidants to the trimethyl-dihydroquinoline while others are entirely ineffective in retarding rubber deterioration. It has now been discovered that consistently good results are obtained with compounds falling in the class of 2,2,4-trialkyl-6-substituted-1,2-dihydroquinolines, wherein at least one alkyl group in the 2 position is a methyl radical and the group substituted in the 6 position is an alkyl, aryl, alkoxyl or aroxyl radical. Copending application, Serial No. 117,006, filed December 21, 1936, describes and claims the use in rubber of 2,2,4 - trialkyl - 6 - aryl - 1,2 - dihydroquinolines, wherein at least one alkyl group in the 2 position is a methyl radical. The present application is a continuation in part of copending applications, Serial Nos. 89,654 and 117,004, filed respectively on July 8, 1936, and December 21, 1936.

Such dihydroquinolines substituted in the 6 position are unique among the substituted dihydroquinolines in respect to the effect thereof in rubber. Said 6-substituted compounds are, in general, considerably more active as antioxidants than isomeric compounds substituted in the 5, 7 or 8 positions. For instance, the 6-phenyl compound is an excellent antioxidant, whereas the 8-phenyl compound is entirely ineffective as a rubber antioxidant. Likewise, the 6-methyl substituted compound is superior in laboratory tests to the unsubstituted simple compound, 2,2,4-trimethyl-1,2-dihydroquinoline, whereas the 7-methyl and 8-methyl substituted compounds are inferior to the simple compound.

Moreover, it has now been ascertained that dihydroquinolines of the type hereinbefore discussed substituted in the 6-position by certain radicals are excellent antioxidants, whereas such dihydroquinolines substituted in the 6 position by certain other radicals are ineffective as rubber antioxidants An example of a radical having a negativing effect on the antioxidant properties of the basic compound is the nitro group (—$NO_2$). On the other hand, such dihydroquinolines substituted in the 6 position by an alkyl, cyclo-alkyl, aryl, alkoxyl or aroxyl group uniformly possess excellent antioxidant properties.

As illustrative examples of the preferred class of compounds, the following specific embodiments of the compound are given:

(a) 2,2,4,6-tetramethyl-1,2-dihydroquinoline of the formula

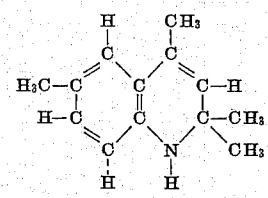

(b). 2,2,4-trimethyl-6-butyl-1,2-dihydroquinoline of the formula

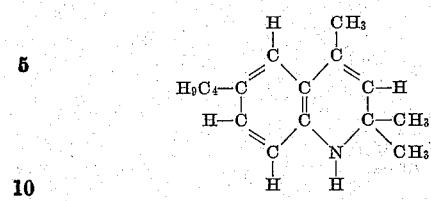

(c) 2,2,4-trimethyl-6-n-amyl-1,2-dihydroquinoline of the formula

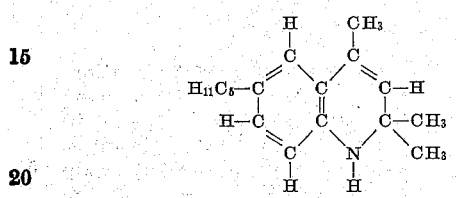

(d) 2,2,4-trimethyl-6-cyclo-hexyl-1,2-dihydroquinoline of the formula

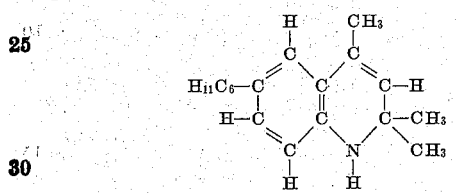

(e) 2,2,4-trimethyl-6-tertiary-amyl-1,2-dihydroquinoline of the formula

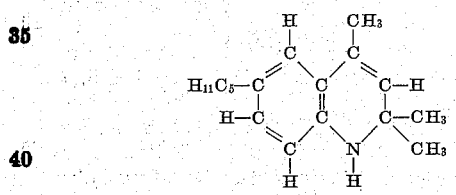

The following are understood to be illustrative embodiments of the invention and are not limitative of the scope thereof.

EXAMPLE 1

Compound $a$ above, 2,2,4,6-tetra-methyl-1,2-dihydroquinoline, was tested as an antioxidant by incorporating it in a rubber composition, vulcanizing the latter and then comparing the resultant product with a control composition consisting of the same ingredients with the exception of the improved antioxidant, which was omitted. The composition of the stocks was as follows:

|  | Control | A |
|---|---|---|
|  | Parts by weight | Parts by weight |
| Smoked sheet rubber | 100 | 100 |
| Sulfur | 3 | 3 |
| Zinc oxide | .5 | .5 |
| Carbon black | 45 | 45 |
| Pine tar | 3 | 3 |
| Stearic acid | 3 | 3 |
| Mercaptobenzothiazole | 1.25 | 1.25 |
| 2,2,4,6-tetramethyl-1,2-dihydroquinoline |  | 1 |

The compositions were thoroughly mixed and then vulcanized under pressure for 120 minutes and 140 minutes at 264° F. Test strips were cut from the vulcanized stocks, some of said strips being artificially aged for 46 hours in the Bierer-Davis oxygen bomb at 70° C. and 300 pounds oxygen pressure. The results of physical tests on these strips are as follows:

*Normal data*

| Composition | Modulus of elasticity in lbs./in.² at 400% elongation | | Tensile strength in lbs./in.² at break | |
|---|---|---|---|---|
|  | 120 | 140 | 120 | 140 |
| Control | 2250 | 2250 | 4650 | 4475 |
| A | 2150 | 2150 | 4600 | 4450 |

*After aging 46 hours in oxygen bomb*

| Composition | Modulus of elasticity in lbs./in.² at 400% elongation | | Tensile strength in lbs./in.² at break | |
|---|---|---|---|---|
|  | 120 | 140 | 120 | 140 |
| Control | 1500 | 1300 | 1825 | 1425 |
| A | 2025 | 2025 | 3125 | 3000 |

EXAMPLE 2

Compounds $b$, $c$ and $d$ above, respectively 2,2,4-trimethyl-6-butyl-1,2-dihydroquinoline, 2,2,4-trimethyl-6-n-amyl-1,2-dihydroquinoline and 2,2,4-trimethyl-6-cyclohexyl-1,2-dihydroquinoline, were tested in a manner analogous to that set forth in Example 1. The composition of the stocks was as follows:

|  | Control | B | C | D |
|---|---|---|---|---|
| Smoked sheet rubber | 100 | 100 | 100 | 100 |
| Sulfur | 2.88 | 2.88 | 2.88 | 2.88 |
| Zinc oxide | 3.3 | 3.3 | 3.3 | 3.3 |
| Carbon black | 49.4 | 49.4 | 49.4 | 49.4 |
| Pine tar | 3.3 | 3.3 | 3.3 | 3.3 |
| Stearic acid | 3.3 | 3.3 | 3.3 | 3.3 |
| Reaction product of mercaptobenzothiazole and formaldehyde* | 1.54 | 1.54 | 1.54 | 1.54 |
| 2,2,4-trimethyl-6-butyl-1,2-dihydroquinoline |  | 0.98 |  |  |
| 2,2,4-trimethyl-6-n-amyl-1,2-dihydroquinoline |  |  | 0.98 |  |
| 2,2,4-trimethyl-6-cyclohexyl-1,2-dihydroquinoline |  |  |  | 0.98 |

*U. S. Patent No. 1,960,197.

The resulting stocks were vulcanized for 120 minutes and 140 minutes at 264° F. The results of physical tests on these stocks are as follows:

*Normal data*

| Composition | Modulus of elasticity in lbs./in.² at 400% elongation | | Tensile strength in lbs./in.² at break | |
|---|---|---|---|---|
|  | 120 | 140 | 120 | 140 |
| Control | 2850 | 2875 | 4250 | 4200 |
| B | 3050 | 3150 | 4500 | 4350 |
| C | 2750 | 2800 | 4450 | 4375 |
| D | 2950 | 2850 | 4500 | 4375 |

*After aging 46 hours in oxygen bomb*

| Composition | Modulus of elasticity in lbs./in.² at 400% elongation | | Tensile strength in lbs./in.² at break | |
|---|---|---|---|---|
|  | 120 | 140 | 120 | 140 |
| Control | 1550 |  | 1550 | 1425 |
| B | 2575 | 2450 | 3050 | 2875 |
| C | 2875 | 2750 | 3575 | 3350 |
| D | 2550 | 2250 | 3125 | 2725 |

*Example 3*

Compound (e) above, 2,2,4-trimethyl-6-tertiary-amyl-1,2-dihydroquinoline, was tested in a manner analogous to that set forth in Example 1. The composition of the stocks was as follows:

|  | Control | E |
|---|---|---|
| Smoked sheet rubber | 100 | 100 |
| Sulfur | 3 | 3 |
| Zinc oxide | 5 | 5 |
| Carbon black | 50 | 50 |
| Pine tar | 2 | 2 |
| Stearic acid | 1.5 | 1.5 |
| Di-ortho-tolyl-guanidine | 1 | 1 |
| 2, 2, 4-trimethyl-6-tertiary-amyl-1, 2-dihydroquinoline |  | 1 |

The resulting stocks were vulcanized for 60, 85 and 120 minutes at 290° F. The results of physical tests on these stocks are as follows:

*Normal data*

| Composition | Modulus of elasticity in lbs./in.² at 400% elongation | | | Tensile strength in lbs./in.² at break | | |
|---|---|---|---|---|---|---|
|  | 60 | 85 | 120 | 60 | 85 | 120 |
| Control | 2300 | 2500 | 2450 | 3900 | 3975 | 3525 |
| E | 2300 | 2450 | 2400 | 3975 | 3900 | 3725 |

*After aging 46 hours in oxygen bomb*

| Composition | Modulus of elasticity in lbs./in.² at 400% elongation | | | Tensile strength in lbs./in.² at break | | |
|---|---|---|---|---|---|---|
|  | 60 | 85 | 120 | 60 | 85 | 120 |
| Control |  |  |  | 1300 | 1575 | 1500 |
| E | 1775 | 1900 |  | 2100 | 2000 | 1775 |

The foregoing data clearly show that the various stocks treated with the improved antioxidants compare favorably with untreated stock in normal condition, and after artificial aging, uniformly show superior modulus and tensile characteristics. Qualitative tests were made on a machine described by L. V. Cooper, Analytical Edition of Industrial and Engineering Chemistry, volume 2, pages 391-394, 1930. Compositions A, B, C, D and E, containing the improved antioxidants were markedly superior in flex-cracking resistance to the respective control compositions.

While the above data cover only specific compounds of the preferred class all members of said class are advantageous in carrying out the objects of the invention. Though the processes and products defined in the claims are primarily useful in connection with vulcanized rubber, they are also effective in improving the aging qualities of unvulcanized rubber, for example, rubber latex compounds and unvulcanized rubber compounds for tire repair purposes.

Modification may be resorted to, and the exact proportions of the constituent materials may be varied, since the invention is not to be limited to the specific examples disclosed.

What is claimed is:

1. A method of retarding the deterioration of rubber which comprises treating rubber with a 1,2-dihydroquinoline of the general formula

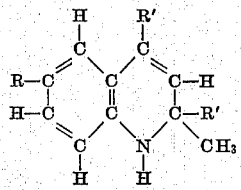

wherein R' is an alkyl radical and R is a member of the group consisting of alkyl and cyclo-alkyl radicals.

2. The method of improving the properties of rubber which comprises vulcanizing the rubber in the presence of a 1,2-dihydroquinoline of the general formula

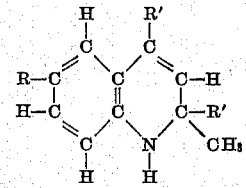

wherein R' is an alkyl radical and R is a member of the group consisting of alkyl and cyclo-alkyl radicals.

3. The method of retarding the deterioration of rubber which comprises treating rubber with a 1,2-dihydroquinoline having alkyl groups in the 4 and 6 positions and two alkyl groups in the 2 position, at least one of which is methyl.

4. The method of improving the properties of rubber which comprises vulcanizing rubber in the presence of a 1,2-dihydroquinoline of the general formula

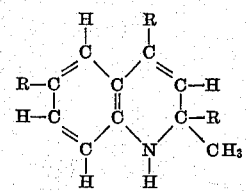

wherein R is an alkyl radical.

5. The method of retarding the deterioration of rubber which comprises treating rubber with 2,2,4,6-tetramethyl-1,2-dihydroquinoline.

6. The method of improving the properties of rubber which comprises vulcanizing the rubber in the presence of 2,2,4,6-tetramethyl-1,2-dihydroquinoline.

7. The method of retarding the deterioration of rubber which comprises treating rubber with 2,2,4-trimethyl-6-butyl-1,2-dihydroquinoline.

8. The method of improving the properties of rubber which comprises vulcanizing rubber in the presence of 2,2,4-trimethyl-6-butyl-1,2-dihydroquinoline.

9. The method of retarding the deterioration of rubber which comprises treating rubber with 2,2,4-trimethyl-6-cyclohexyl-1,2-dihydroquinoline.

10. The method of improving the properties of rubber which comprises vulcanizing rubber in the presence of 2,2,4-trimethyl-6-cyclohexyl-1,2-dihydroquinoline.

11. A rubber composition comprising a 1,2-dihydroquinoline of the general formula

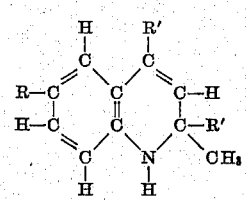

wherein R' is an alkyl radical and R is a member of the group consisting of alkyl and cyclo-alkyl radicals.

12. A rubber composition comprising a 1,2-dihydroquinoline having alkyl groups in the 4 and 6 positions and two alkyl groups in the 2 position, at least one of which is methyl.

13. A rubber composition comprising 2,2,4,6-tetramethyl-1,2-dihydroquinoline.

14. A rubber composition comprising 2,2,4-trimethyl-6-butyl-1,2-dihydroquinoline.

15. A rubber composition comprising 2,2,4-trimethyl-6-cyclohexyl-1,2-dihydroquinoline.

RAYMOND F. DUNBROOK.
BINGHAM J. HUMPHREY.